(12) United States Patent
Kojima et al.

(10) Patent No.: US 9,085,994 B2
(45) Date of Patent: Jul. 21, 2015

(54) GAS TURBINE

(75) Inventors: Katsuhisa Kojima, Tokyo (JP); Yasutoshi Ueda, Tokyo (JP); Takashi Sonoda, Tokyo (JP); Masao Terazaki, Tokyo (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 707 days.

(21) Appl. No.: 13/496,604

(22) PCT Filed: Nov. 11, 2010

(86) PCT No.: PCT/JP2010/070144
§ 371 (c)(1),
(2), (4) Date: Mar. 16, 2012

(87) PCT Pub. No.: WO2011/083628
PCT Pub. Date: Jul. 14, 2011

(65) Prior Publication Data
US 2012/0177481 A1 Jul. 12, 2012

(30) Foreign Application Priority Data
Jan. 5, 2010 (JP) ................. 2010-000484

(51) Int. Cl.
*F01D 25/12* (2006.01)
*F02C 7/18* (2006.01)

(52) U.S. Cl.
CPC . *F01D 25/12* (2013.01); *F02C 7/18* (2013.01); F05D 2260/606 (2013.01); F05D 2260/607 (2013.01)

(58) Field of Classification Search
CPC ............... F05D 2260/606; F05D 2260/607; F02C 7/18
See application file for complete search history.

(56) References Cited

U.S. PATENT DOCUMENTS 4,767,259 A * 8/1988 Kurosawa et al. ............. 415/17
5,121,599 A 6/1992 Snyder et al.
(Continued)

FOREIGN PATENT DOCUMENTS

CN 1310292 A 8/2001
EP 0 440 164 A1 8/1991
(Continued)

OTHER PUBLICATIONS

International Search Report of PCT/JP2010/070144, mailing date Jan. 18, 2011.
(Continued)

*Primary Examiner* — Edward Look
*Assistant Examiner* — Jason Davis
(74) *Attorney, Agent, or Firm* — Westerman, Hattori, Daniels & Adrian, LLP

(57) ABSTRACT

This gas turbine includes a turbine cooling structure of cooling a turbine by using cooling air and a filter that reduces dust in the cooling air on an upstream side of the turbine. Furthermore, the gas turbine includes a supply pipe for supplying the cooling air to the filter, a branch pipe that is branched from the supply pipe on an upstream of the filter, and a unit that calculates or estimates a circulation amount of dust in the cooling air. In this gas turbine, at a time of start-up of a turbine, the supply pipe is closed and the branch pipe is opened, and when the circulation amount of dust in the cooling air becomes equal to or less than a predetermined threshold, the supply pipe is opened and the branch pipe is closed.

6 Claims, 9 Drawing Sheets

(56) References Cited

U.S. PATENT DOCUMENTS

| | | | | |
|---|---|---|---|---|
| 5,185,997 | A | * | 2/1993 | Nishijima .................. 60/806 |
| 6,769,259 | B2 | * | 8/2004 | Yamanaka et al. ............ 60/778 |
| 6,792,762 | B1 | | 9/2004 | Yamanaka et al. |
| 2003/0024233 | A1 | * | 2/2003 | Snyder .................. 60/39.092 |
| 2008/0016971 | A1 | * | 1/2008 | Bunce et al. ............... 73/865.5 |

FOREIGN PATENT DOCUMENTS

| | | |
|---|---|---|
| EP | 1 128 039 A2 | 8/2001 |
| EP | 1 314 872 A1 | 5/2003 |
| JP | 4-318230 A | 11/1992 |
| JP | 5-179993 A | 7/1993 |
| JP | 2006-329071 A | 12/2006 |
| WO | 98/54452 A1 | 12/1998 |

OTHER PUBLICATIONS

Written Opinion of PCT/JP2010/070144, mailing date Jan. 18, 2011.

Notification of Grant of Invention Patent dated Jul. 17, 2014, issued in Chinese Application No. 201080049240.0; w/ English translation (6 pages).

Korean Notice of Allowance dated Nov. 25, 2013, issued in Korean Patent Application No. 10-2012-7010926, w/partial English translation.

Extended European Search Report dated May 22, 2013, issued in corresponding European Patent Application No. 10842143.9 (4 pages).

Chinese Office Action dated Nov. 22, 2013, issued in Chinese Patent Application No. 201080049240.0, w/English translation, (16 pages).

* cited by examiner

US 9,085,994 B2

GAS TURBINE

FIELD

The present invention relates to a gas turbine, and more particularly to a gas turbine that can properly protect a turbine while ensuring dust-reduction processing performance of a filter by preventing occurrence of a state where cooling air containing excessive dust is supplied to the filter.

BACKGROUND

A general turbine has a structure of cooling the turbine by using cooling air (a turbine cooling structure). Cooling air in the turbine contains a considerable amount dust (such as dust and rust). Therefore, in the turbine cooling structure, a filter is arranged on an upstream side of the turbine, thereby performing a reduction process of the dust in the cooling air by using the filter. With this structure, the inflow amount of dust to the turbine is reduced. As a conventional gas turbine employing such a structure, there has been known a technique described in Patent Literature 1.

CITATION LIST

Patent Literature

Patent Literature 1: Japanese Patent Application Laid-open No. H5-179993

SUMMARY

Technical Problem

An object of the present invention is to provide a gas turbine that can properly protect a turbine while ensuring dust-reduction processing performance of a filter by preventing the filter which is restricted in a dust collection performance by allowable pressure loss of a cooling air pipe from an occurrence of a state where cooling air containing excessive dust is supplied to the filter.

Solution to Problem

According to an aspect of the present invention, a gas turbine including a turbine cooling structure of cooling a turbine by using cooling air and a filter that reduces dust in the cooling air on an upstream side of the turbine, includes: a supply pipe for supplying the cooling air to the filter; a branch pipe that is branched from the supply pipe on an upstream of the filter; and a unit that calculates or estimates a circulation amount of dust in the cooling air. At a time of start-up of a turbine, the supply pipe is closed and the branch pipe is opened, and when the circulation amount of dust in the cooling air becomes equal to or less than a predetermined threshold, the supply pipe is opened and the branch pipe is closed.

Advantageously, in the gas turbine, the circulation amount of dust in the cooling air is monitored by using a dust monitor, and the circulation amount of dust in the cooling air is calculated or estimated based on a result of the monitoring.

Advantageously, in the gas turbine, when a revolution speed of a turbine becomes equal to or higher than a predetermined threshold, it is estimated that the circulation amount of dust in the cooling air has become equal to or less than a predetermined threshold.

Advantageously, in the gas turbine, when a predetermined time has passed since start-up of a turbine, it is estimated that the circulation amount of dust in the cooling air has become equal to or less than a predetermined threshold.

Advantageously, in the gas turbine, when the circulation amount of dust in the cooling air has become equal to or less than a predetermined threshold, the cooling air bypasses the filter and is supplied to the turbine.

Advantageously, in the gas turbine, the filter has a structure of separating dust from the cooling air by centrifugal separation or inertial separation to extract dustless cooling air, and supplies extracted cooling air to the turbine.

Advantageous Effects of Invention

In the gas turbine according to the present invention, immediately after start-up of the turbine, cooling air is bypassed by a branch pipe and is not supplied to the filter. Therefore, a state where cooling air containing excessive dust is supplied to the filter is prevented. Furthermore, when a circulation amount of dust in the cooling air becomes equal to or less than a predetermined threshold, the cooling air is supplied to the filter. With this configuration, a state where cooling air containing excessive dust is supplied to the filter is prevented, and thus dust-reduction processing performance of the filter is ensured and the turbine is properly protected.

DESCRIPTION OF EMBODIMENTS

The present invention is explained below in detail with reference to the accompanying drawings. The present invention is not limited to the following embodiment. In addition, constituent elements in the embodiment include elements that can be easily replaceable or obviously replaceable while maintaining the unity of invention. In addition, a plurality of modifications described in the embodiment can be arbitrarily combined within a scope obvious to persons skilled in the art.

[Gas Turbine]

Figure 1:
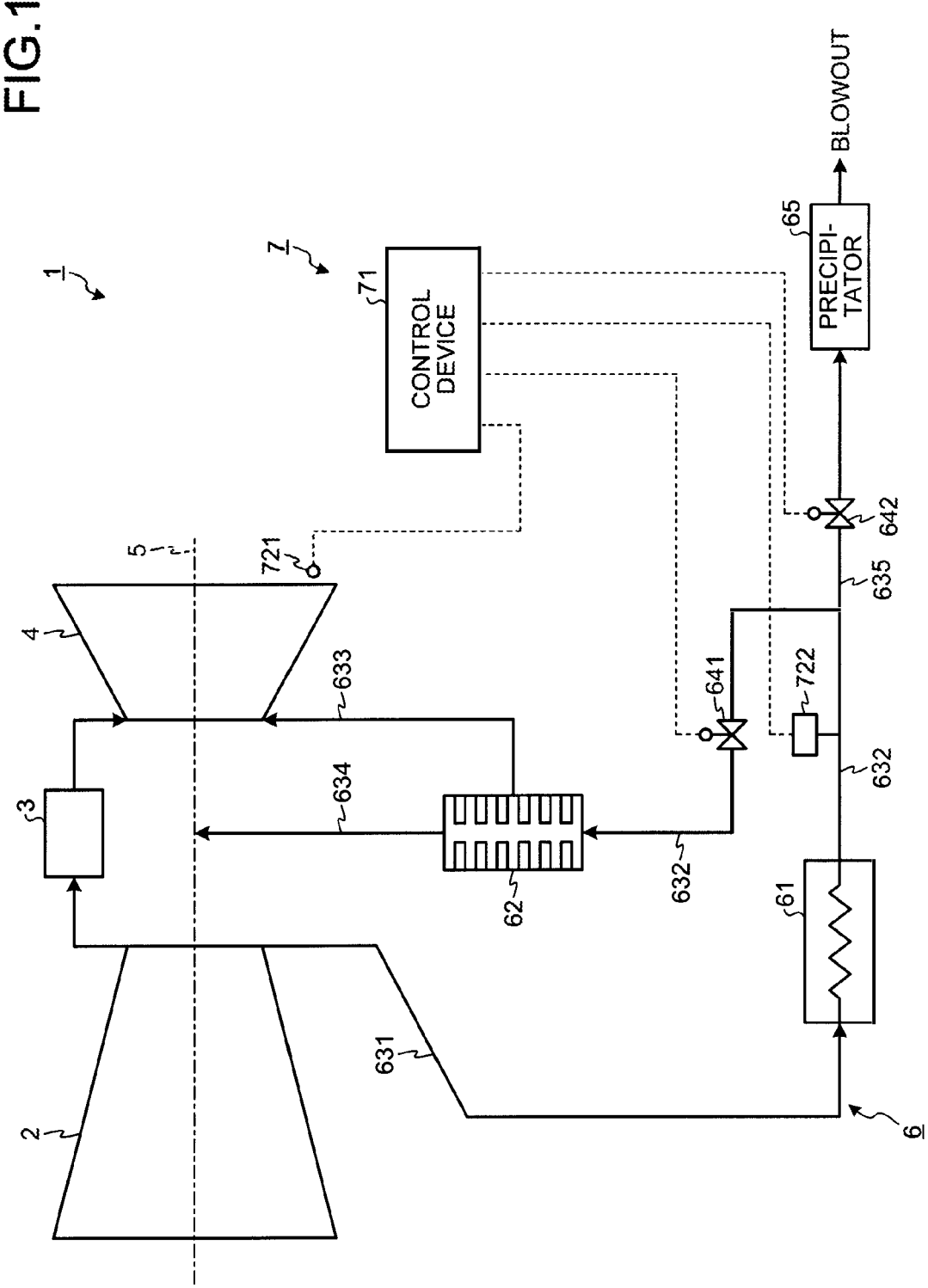
FIG. 1 is a configuration diagram of a gas turbine according to an embodiment of the present invention.

FIG. 1 is a configuration diagram of a gas turbine according to an embodiment of the present invention. A gas turbine 1 includes a compressor 2, a combustor 3, and a turbine 4. In the gas turbine 1, the compressor 2 first compresses air introduced from an air intake to generate compressed air. The combustor 3 then injects fuel to the compressed air to generate high-temperature and high-pressure combustion gas. The turbine 4 then converts a thermal energy of the combustion gas into a rotational energy of a rotor 5 to generate a driving force. The driving force is then transmitted to a power generator (not shown) or the like connected to the rotor 5.

[Turbine Cooling Structure]

The gas turbine 1 has a turbine cooling structure 6 of cooling the turbine 4 by using cooling air (see FIG. 1). The turbine cooling structure 6 includes a cooler 61 and a filter 62, and is constituted by connecting the cooler 61 and the filter 62 to each other via supply pipes (supply flow paths of cooling air) 631 to 634. The cooler 61 is a device that cools air passing therethrough, and for example, a water-cooled type device is employed. The cooler 61 is connected to a downstream side of the compressor 2 via the supply pipe 631 at an inlet port of the cooler 61. The filter 62 is a device that has a structure of separating dust from air to extract a part of dustless air (a centrifugal separation structure or an inertial dust collection structure) (see FIG. 2). The filter 62 is connected to an outlet port of the cooler 61 via the supply pipe 632 at an inlet port 622 thereof. Furthermore, the filter 62 is connected to a cooling path (not shown) of the turbine 4 via the supply pipe 633 at one outlet port, and is connected to a casing (not shown) of the gas turbine 1 via the supply pipe 634 at the other outlet port.

In the turbine cooling structure 6, high-temperature and high-pressure air compressed by the compressor 2 is introduced into the cooler 61 via the supply pipe 631. The air is cooled by the cooler 61 to be cooling air. The cooling air is then supplied from the cooler 61 to the filter 62 via the supply pipe 632. A part of dust-reduced cooling air (dustless cooling air) is extracted by the filter 62, and then supplied from one outlet port of the filter 62 to the cooling path of the turbine 4 via the supply pipe 633. Remaining cooling air (dust-rich cooling air) is returned from the other outlet port of the filter 62 to the casing of the gas turbine 1 via the supply pipe 634. For example, the cooling path of the turbine 4 is a cooling path formed in a turbine rotor and a cooling path formed in a rotor blade and a nozzle of the turbine.

[Specific Example of Filter]

Figure 2:
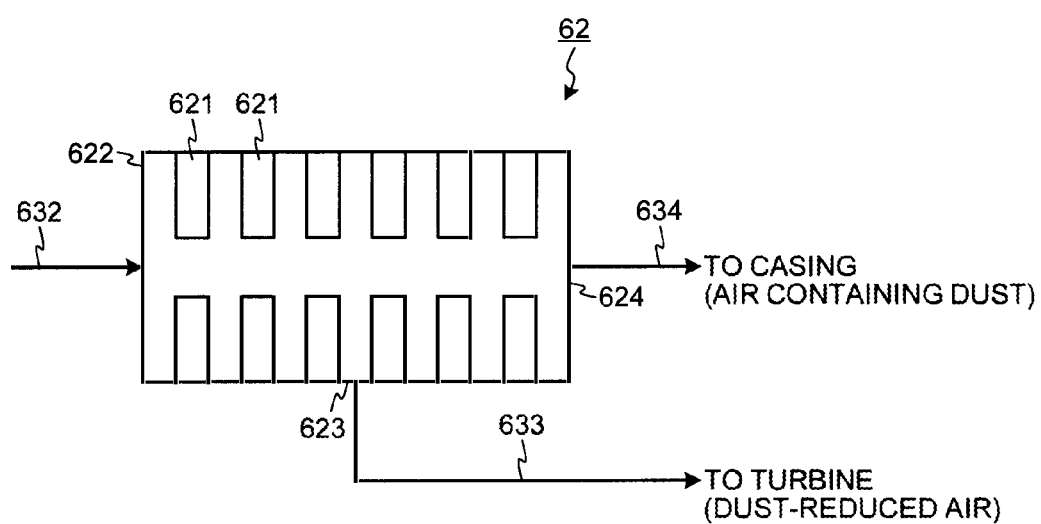
FIG. 2 is a schematic diagram of a filter of a turbine cooling structure in the gas turbine shown in FIG. 1.

FIG. 2 is a schematic diagram of the filter 62 of the turbine cooling structure 6. For example, in the present embodiment, the filter 62 has a centrifugal separation structure or an inertial dust collection structure formed by stacking a plurality of metal elements 621 (see FIG. 2). Specifically, the metal elements 621 are stacked and arranged in a pressure tight container in an axial direction of the pressure tight container (in an air passage direction). These metal elements 621 and the inlet port 622 and an outlet port 624 of the pressure tight container are linearly communicated with each other in the axial direction of the pressure tight container. A bleed portion 623 is pulled out from the inside of the metal element 621.

In the filter 62, in a case of an inertial dust collection structure, for example, when air is introduced into the pressure tight container from the inlet port 622 thereof, a part of air rapidly changes its flow direction in the metal elements 621, and only dust having a strong inertial force is discharged from the bleed portion 623. At this time, dust in the air is centrifuged and dustless air is discharged (dust reduction from air). The dustless air is supplied from the bleed portion 623 to the cooling path of the turbine 4 via the supply pipe 633. On the other hand, remaining air (dust-rich air) linearly passes through the metal elements 621 and is discharged from the outlet port 624 of the pressure tight container. The dust-rich air is then returned from the outlet port 624 to the casing of the gas turbine 1 via the supply pipe 634.

The filter 62 can extract dustless air of 5% to 10% with respect to an amount of air passing therethrough during a steady operation of a turbine. Furthermore, dust collected by the metal elements 621 is directly discharged from the outlet port 624 of the pressure tight container, thereby performing automatic cleaning of the filter 62 (the metal elements 621).

[Dust Reduction Control at the Time of Start-Up of Turbine]

Cooling air for a turbine has a considerable amount of dust (such as dust and rust). Therefore, in a turbine cooling structure, a filter is used as described above to reduce dust in cooling air. Accordingly, the inflow amount of dust into the turbine is reduced.

When the gas turbine is shut down for a long period of time (for example, shutdown for one week to several weeks) due to periodic inspections, a large amount of dust is circulated into cooling air at the time of restarting the turbine. For example, in a general gas turbine, because pipes of its turbine cooling structure is made of steel, if the gas turbine is shut down for a long period of time, a large amount of rust is generated in the pipes. Consequently, at the time of start-up of the turbine, the large amount of rust becomes dust and is circulated into the pipes along with cooling air.

However, if cooling air including such a large amount of dust flows into a filter, dust reduction performance of the filter (dust inertial separation performance) becomes insufficient and dust may flow into the turbine.

Therefore, in the gas turbine 1, the following configuration is employed for ensuring the dust reduction performance of the filter 62 at the time of start-up of the turbine (see FIG. 1).

The turbine cooling structure 6 includes a branch pipe (a bypass line) 635 branched from the supply pipe 632 on the filter 62 on an upstream side of the filter 62. In the present embodiment, there is provided the supply pipe 632 that connects the cooler 61 and the filter 62 to each other, and the branch pipe 635 is branched in the middle of the supply pipe 632. The supply pipe 632 on the filter 62 and the branch pipe 635 are opened or closed by opening/closing valves 641 and 642 installed in the supply pipe 632 and the branch pipe 635, respectively. In addition, a precipitator 65 is arranged on the branch pipe 635. The precipitator 65 is a device that collects dust in the air, and is constituted by a cyclone or a filter, for example.

A control system 7 is also provided in the gas turbine 1. The control system 7 includes a control device 71 and various sensors 721 and 722. The control device 71 is constituted by an ECU (Electronic Control Unit), for example. For instance, the various sensors 721 and 722 are, respectively, a revolution speed sensor 721 that detects the revolution speed of the turbine 4 and a dust monitor 722 that is arranged in a flow path of cooling air to monitor the circulation amount of dust in cooling air. In the control system 7, the control device 71 controls opening and closing operations of the opening/closing valves 641 and 642 on the supply pipe 632 and the branch pipe 635 based on output values of the various sensors 721 and 722, thereby performing dust reduction control described later.

Figure 3:
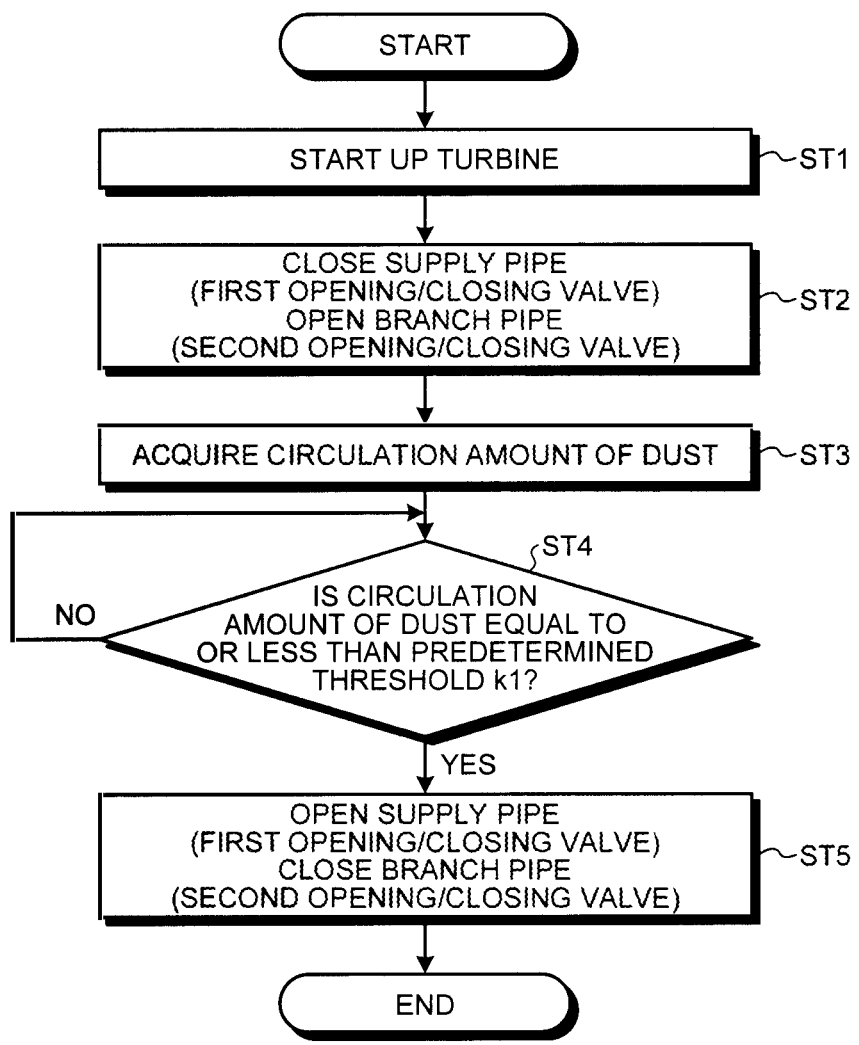
FIG. 3 is a flowchart of an operation of the gas turbine shown in FIG. 1.
Figure 4:
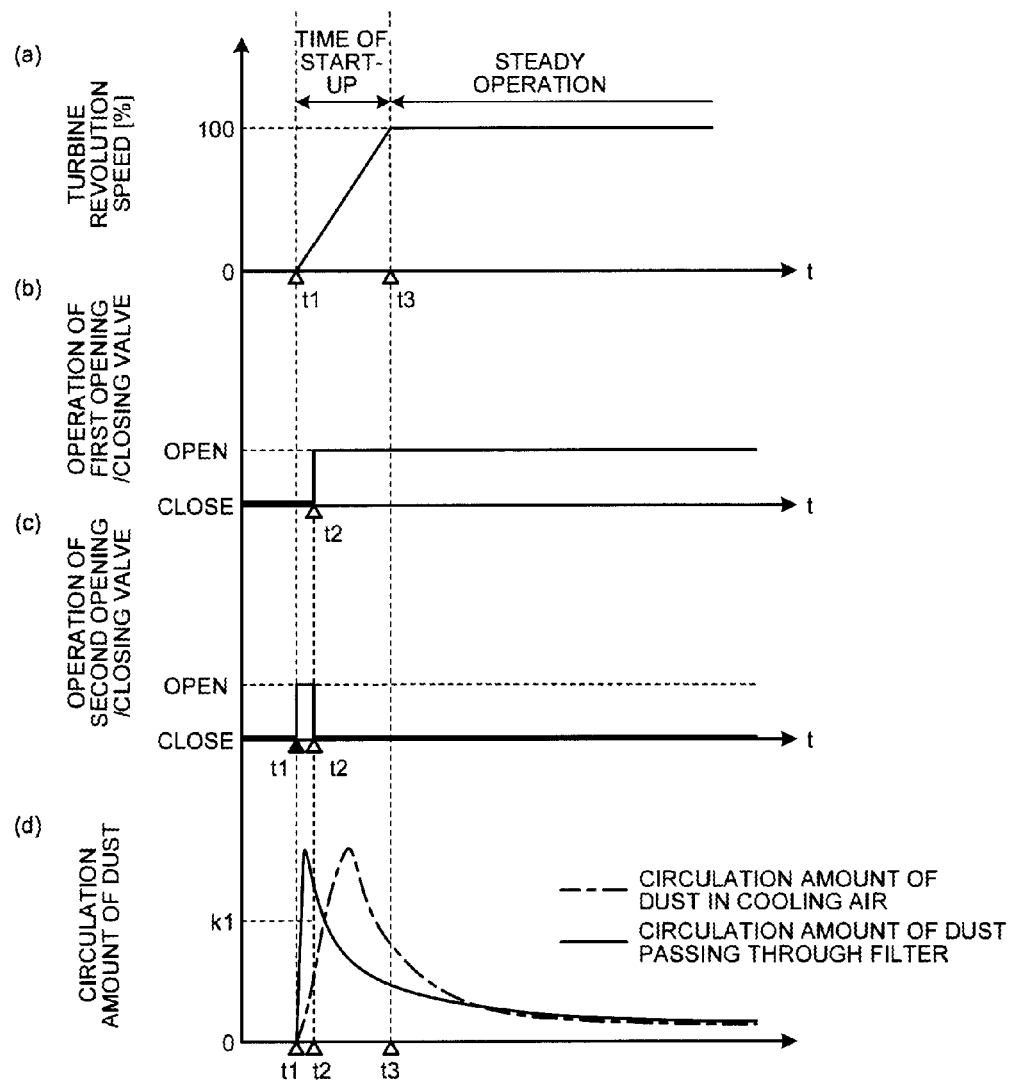
FIG. 4 is a time chart of an operation of the gas turbine shown in FIG. 1.

FIGS. 3 and 4 are, respectively, a flowchart (FIG. 3) and a time chart (FIG. 4) of an operation of the gas turbine shown in FIG. 1. In the gas turbine 1, dust reduction control described below is performed at the time of start-up of a turbine.

When the gas turbine 1 is started (t=t1) (Step ST1), the first opening/closing valve 641 on the supply pipe 632 is closed, and the second opening/closing valve 642 on the branch pipe 635 is opened (Step ST2) (see FIGS. 1, 3, and 4). In this state, cooling air from the compressor 2 flows toward the branch pipe 635 while passing through the cooler 61. The cooling air at the time of start-up of the turbine includes a large amount of dust (particularly, a large amount of rust in pipes generated at the time of restarting the gas turbine 1 after shutdown for a long period of time). The large amount of dust is collected and recovered by the precipitator 65 on the branch pipe 635. At this time, because the supply pipe 632 on the filter 62 is closed, the cooling air is not supplied to the filter 62. Therefore, a state where a large amount of dust flows into the filter 62 as well as into the turbine 4 is prevented. Because the pressure of the cooling air having passed through the precipitator 65 has dropped, the cooling air is directly released (blown out) to the atmosphere.

Step ST2 can be performed simultaneously with start-up of the gas turbine 1 (t=t1), or can be performed prior to the start-up of the gas turbine 1 (t=t1) in advance.

Next, a circulation amount of dust in cooling air is calculated or estimated (Step ST3). For example, in the present embodiment, the control device 71 monitors the circulation amount of dust in cooling air by using the dust monitor 722, and calculates or estimates the circulation amount of dust in cooling air based on the monitoring result.

Next, it is determined whether the circulation amount of dust in cooling air is equal to or less than a predetermined threshold k1 (Step ST4). The threshold k1 is set based on the circulation amount of dust that can sufficiently ensure the processing capacity of the filter 62. When the determination result at Step ST4 is YES, the process proceeds to Step ST5, and when the determination result is NO, Step ST4 is repeated.

Next, the first opening/closing valve 641 on the supply pipe 632 is opened, and the second opening/closing valve 642 on the branch pipe 635 is closed (t=t2) (Step ST5). That is, when the circulation amount of dust in cooling air becomes equal to or less than the predetermined threshold k1, the supply pipe 632 is opened and the branch pipe 635 is closed. In this state, cooling air from the compressor 2 passes through the cooler 61 and is supplied to the filter 62. Dust reduction in cooling air is then performed by the filter 62, and dustless cooling air is extracted. Thereafter, the dustless cooling air is supplied to the cooling path of the turbine 4 via the supply pipe 633 to cool the turbine. Remaining air (dust-rich air) is returned to the casing of the gas turbine 1 via the supply pipe 634.

In FIG. 4(*d*), the one-dot chain line indicates a circulation amount of dust in cooling air generated at the time of restarting the gas turbine 1 after shutdown for a long period of time, and the solid line indicates a circulation amount of dust in cooling air supplied to the filter 62 at the time of execution of the dust reduction control described above (see FIG. 3). As shown in FIG. 3, the circulation amount of dust generated at the time of restarting the gas turbine 1 has a peak immediately after start-up of the turbine, and then gradually decreases in several minutes later to fall within a range of the processing capacity of the filter 62. When the gas turbine 1 is in a steady operation state (t=t3), dust in cooling air generally decreases and converges to a steady-state value.

In the dust reduction control of the gas turbine 1, immediately after start-up of the turbine (t=t1 to t2), cooling air is bypassed by the branch pipe 635 and is not supplied to the filter 62, and thus a state where cooling air containing excessive dust is supplied to the filter 62 is prevented (see FIG. 4). Furthermore, when the circulation amount of dust in cooling air becomes equal to or less than the predetermined threshold k1 (t=t2 onwards), cooling air is supplied to the filter 62. At this time, the threshold k1 is set based on the circulation amount of dust that can sufficiently ensure the processing capacity of the filter 62. Accordingly, because a state where cooling air containing excessive dust is supplied to the filter 62 is prevented, the dust-reduction processing performance of the filter 62 is properly ensured. With this configuration, the amount of dust passing through the filter and flowing into the turbine is reduced, thereby properly protecting the turbine 4 from dust in cooling water. At the time of start-up of the turbine, because the turbine 4 does not need to be cooled, there is hardly any problem even if cooling air to the turbine 4 is blocked off due to the dust reduction control described above.

In the present embodiment, the dust monitor 722 is arranged on the supply pipe 632 that connects the cooler 61 and the filter 62 to each other and on an upstream side of a branch point into the branch pipe 635 (see FIG. 1). However, the arrangement of the dust monitor 722 is not limited thereto, and the dust monitor 722 can be arranged on the branch pipe 635 and on a downstream side of the branch point into the supply pipe 632 (this arrangement is not shown in the drawings). Even with this configuration, the circulation amount of dust in cooling air can be monitored by using the dust monitor 722.

[Acquisition of Circulation Amount of Dust in Cooling Air]

As described above, in the present embodiment, (1) the control device 71 monitors the circulation amount of dust in cooling air by using the dust monitor 722, to calculate or estimate the circulation amount of dust in cooling air based on the monitoring result (Step ST3) (see FIGS. 1 and 3). With this configuration, the circulation amount of dust in cooling air can be directly acquired by the dust monitor 722, which is preferable because the circulation amount of dust can be accurately calculated or estimated.

However, the present embodiment is not limited to the above example, and (2) the control device 71 can acquire a turbine revolution speed and when the turbine revolution speed becomes equal to or higher than a predetermined threshold, the control device 71 can assume that the circulation amount of dust in cooling air has become equal to or less than the predetermined threshold k1 (Step ST4) (not shown). The turbine revolution speed is acquired as an output value of the revolution speed sensor 721. Furthermore, a relation between the turbine revolution speed and the circulation amount of dust in cooling air is acquired as a result of prior tests. With this configuration, the circulation amount of dust in cooling air can be acquired more easily than in the configuration using the dust monitor 722 (see FIG. 1). Accordingly, the dust reduction control of the gas turbine 1 can be easily performed. In a general gas turbine, the circulation amount of dust in cooling air becomes equal to or less than the predetermined threshold k1 before the turbine revolution speed becomes 100%.

Further, the present embodiment is not limited to the above examples, and (3) when a predetermined time has passed since start-up of the turbine, the control device 71 can assume that the circulation amount of dust in cooling air has become equal to or less than the predetermined threshold k1 (Step ST4) (not shown). An elapsed time since start-up of the turbine is acquired by using a timer (not shown) incorporated in the control device 71, for example. Further, a relation between the elapsed time since start-up of the turbine and the circulation amount of dust in cooling air is acquired as a result of prior tests. With this configuration, the circulation amount of dust in cooling air can be acquired more easily than in the configuration using the dust monitor 722 (see FIG. 1). Accordingly, the dust reduction control of the gas turbine 1 can be easily performed.

[Modification 1]

Figure 5:
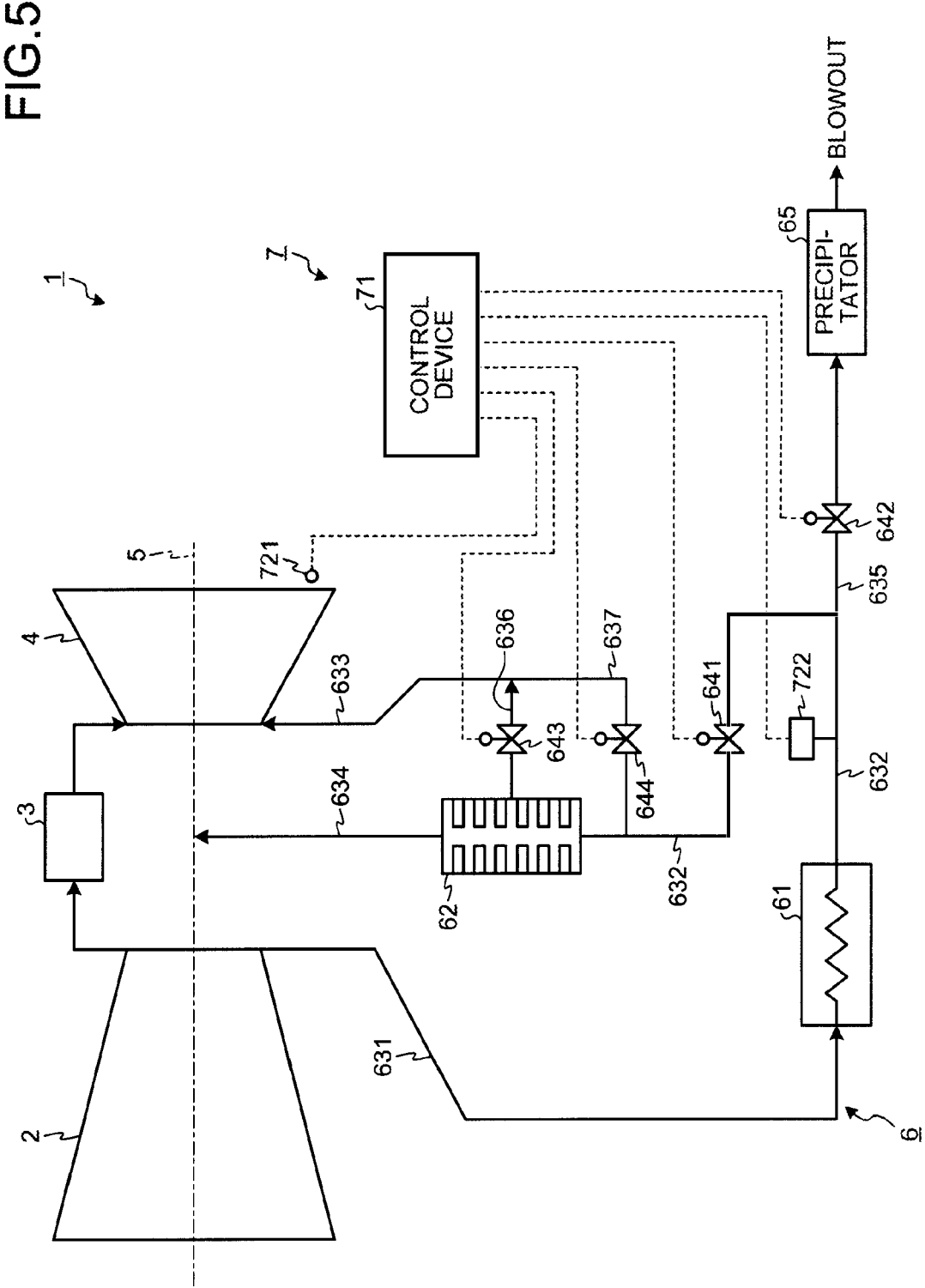
FIG. 5 is a configuration diagram of a modification of the gas turbine shown in FIG. 1.
Figure 6:
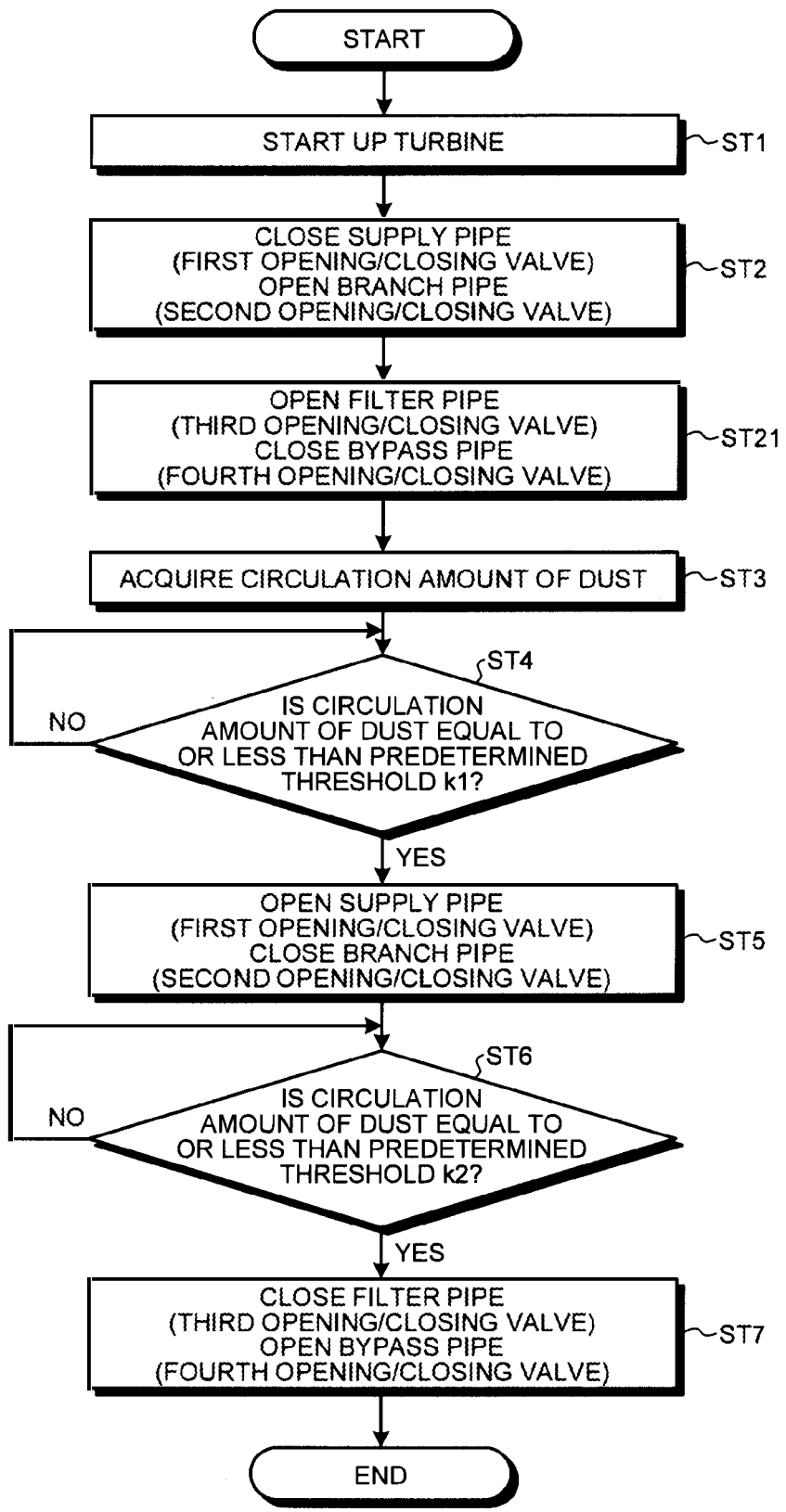
FIG. 6 is a flowchart of an operation of a gas turbine shown in FIG. 5.
Figure 7:
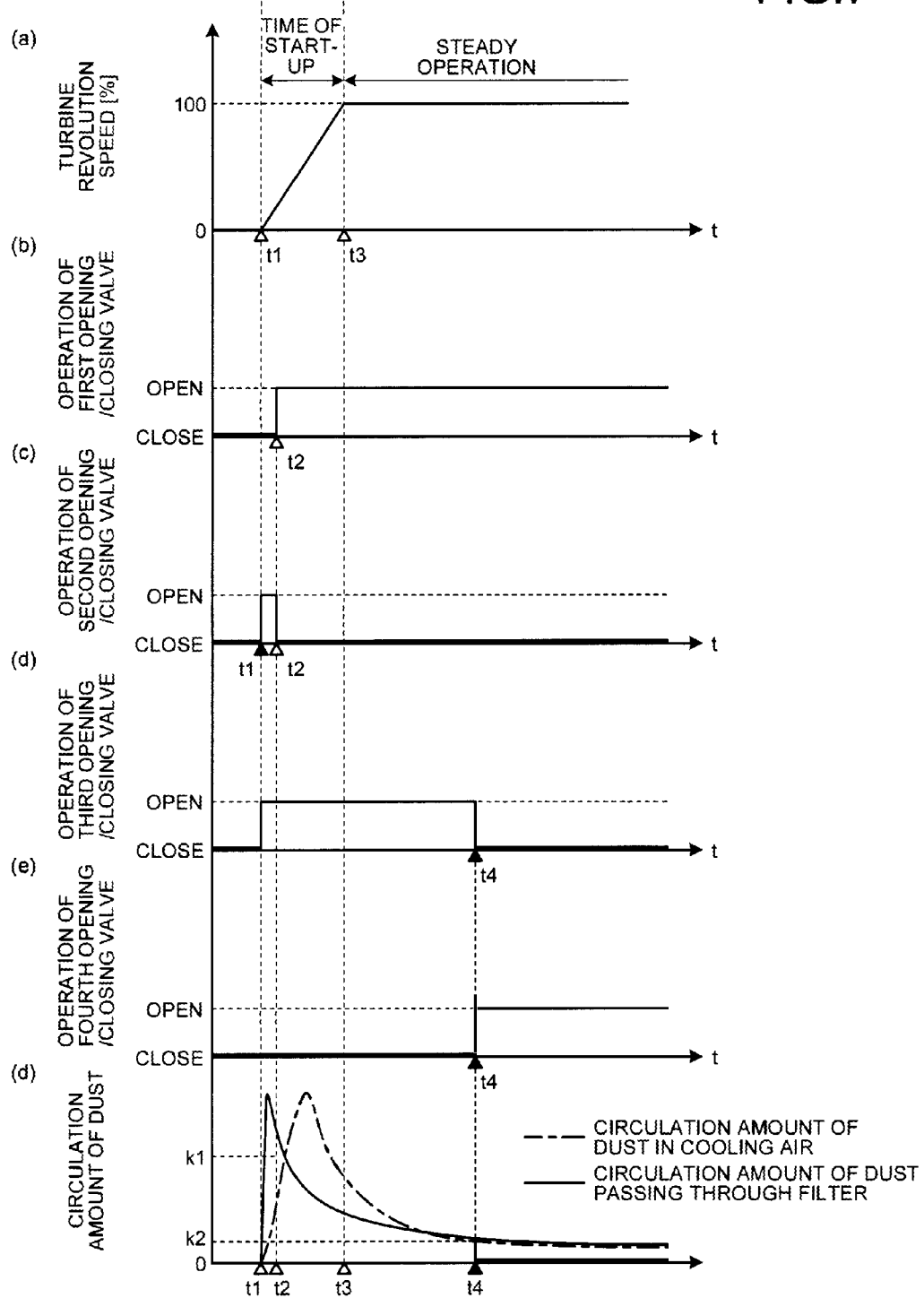
FIG. 7 is an explanatory diagram of an operation of the gas turbine shown in FIG. 5.

FIG. 5 is a configuration diagram of a modification of the gas turbine shown in FIG. 1. FIGS. 6 and 7 are, respectively, a flowchart (FIG. 6) and an explanatory diagram (FIG. 7) of an operation of a gas turbine shown in FIG. 5. In these drawings, constituent elements identical to those of the gas turbine 1 shown in FIG. 1 are denoted by like reference signs and explanations thereof will be omitted.

The gas turbine 1 according to this modification is different from that having the configuration shown in FIG. 1 in that a bypass pipe 637 that bypasses the filter 62 and is connected to the turbine 4 is provided. Specifically, there is provided the supply pipe 633 that is connected to the turbine 4, and a filter pipe 636 for causing dustless cooling air extracted by the filter 62 to flow into the supply pipe 633, and the bypass pipe 637 that bypasses the filter 62 on an upstream side of the filter 62 and is connected to the supply pipe 633 on the turbine 4 are installed. Furthermore, in the filter pipe 636 and the bypass pipe 637, a third opening/closing valve 643 and a fourth opening/closing valve 644 are respectively installed. The control device 71 opens or closes these opening/closing valves 643 and 644 to supply cooling air to the turbine 4 by switching dustless cooling air extracted by the filter 62 (cooling air passing through the third opening/closing valve 643) and cooling air having bypassed the filter 62 (cooling air passing through the fourth opening/closing valve 644).

In the gas turbine 1, in an initial state at the time of start-up of the turbine (t=t1) (Step ST1), the third opening/closing valve 643 on the filter pipe 636 is in an opened state, and the fourth opening/closing valve 644 on the bypass pipe 637 is in a closed state (Step ST21) (see FIGS. 5 to 7).

The circulation amount of dust in cooling air has a peak immediately after start-up of the turbine (see FIG. 7(f)). Therefore, at the time of start-up of the turbine, the branch pipe 635 is used to cause cooling air to bypass the filter, thereby stopping the supply of cooling air to the filter 62 (Steps ST1 to ST5) (see FIG. 5). Accordingly, a state where cooling air containing excessive dust is supplied to the filter is prevented, and thus the dust-reduction processing performance of the filter 62 is ensured and the turbine 4 is properly protected.

Thereafter, the circulation amount of dust in cooling air gradually decreases with the passage of time to approach a steady-state value (a numerical value of the atmospheric level) (see FIG. 7(f)).

After the turbine 4 has become a steady operation state, it is determined whether the circulation amount of dust in cooling air is equal to or less than a predetermined threshold k2 (Step ST6). The threshold k2 is a value smaller than the threshold k1, and is set based on a circulation amount of dust, at which dust reduction in cooling air does not need to be performed by the filter 62 (for example, a circulation amount of dust at the atmospheric level). When the determination result at Step ST6 is YES, the process proceeds to Step ST7, and when the determination result is NO, Step ST6 is repeated.

Next, the third opening/closing valve 643 on the filter pipe 636 is closed, and the third opening/closing valve 644 on the bypass pipe 637 is opened (t=t4) (Step ST7). That is, when the circulation amount of dust in cooling air sufficiently decreases to become equal to or less than the predetermined threshold k2, the filter pipe 636 is closed and the bypass pipe 637 is opened. In this state, cooling air from the compressor 2 bypasses the filter 62 and is directly supplied to the turbine 4. With this configuration, a pressure loss in cooling air at the filter 62 is avoided, and thus the cooling efficiency of the turbine 4 is improved. Furthermore, because the circulation amount of dust in cooling air supplied to the turbine 4 is sufficiently small (equal to or less than the threshold k2), operations of the turbine 4 are not interrupted.

In the configuration shown in FIG. 5, the dust monitor 722 is arranged on the supply pipe 632 that connects the cooler 61 and the filter 62 to each other and on the upstream side of the branch point into the branch pipe 635. However, the arrangement of the dust monitor 722 is not limited thereto, and a pair of dust monitors 722 can be arranged, respectively, on the branch pipe 635 and on a downstream side of a branch point into the supply pipe 632, and on the supply pipe 632 and on the downstream side of the branch point into the branch pipe 635 (this arrangement is not shown in the drawings). Even with this configuration, the circulation amount of dust in cooling air can be monitored by using the dust monitors 722.

[Modification 2]

Figure 8:
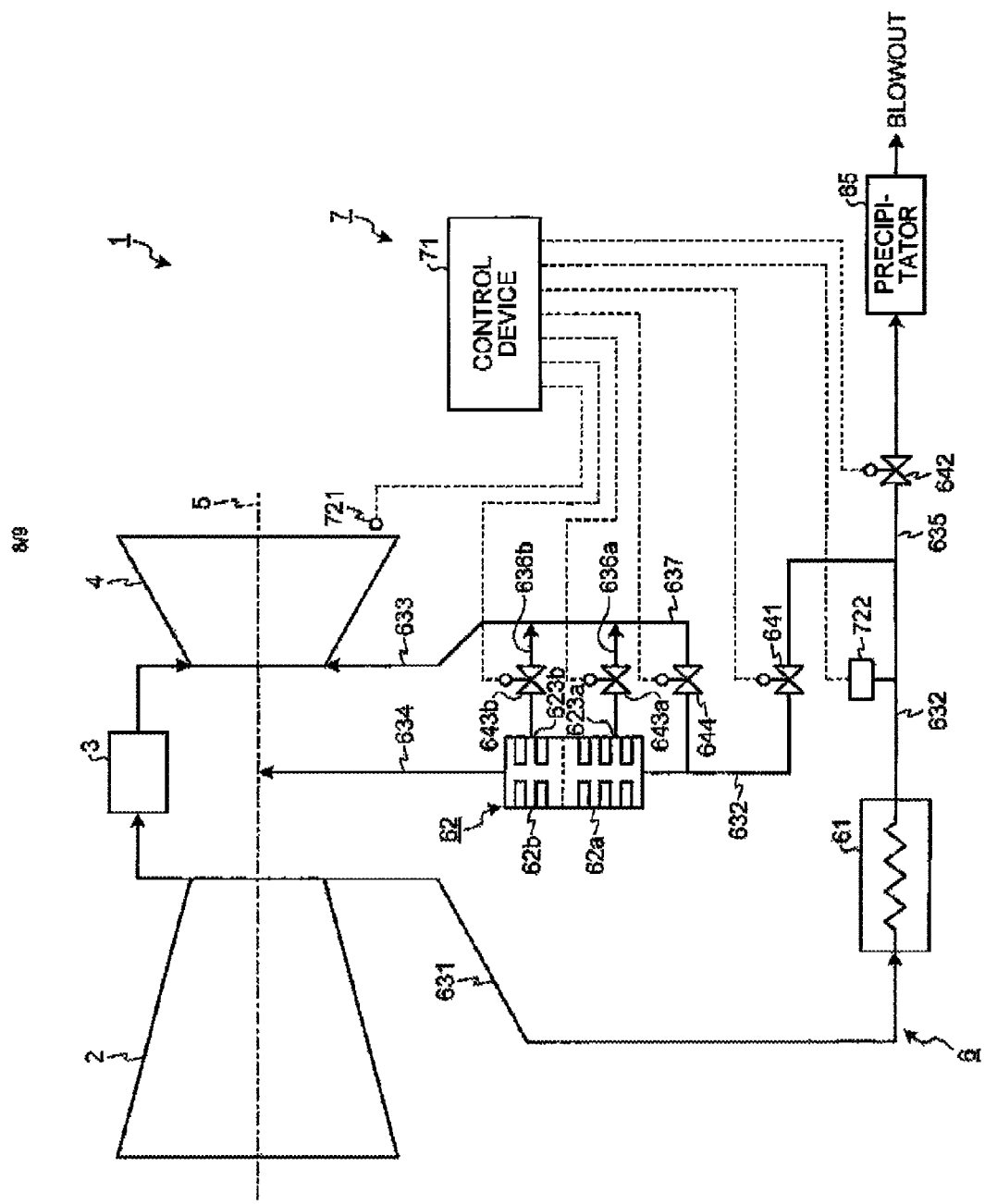
FIG. 8 is a configuration diagram of a modification of the gas turbine shown in FIG. 5.
Figure 9:
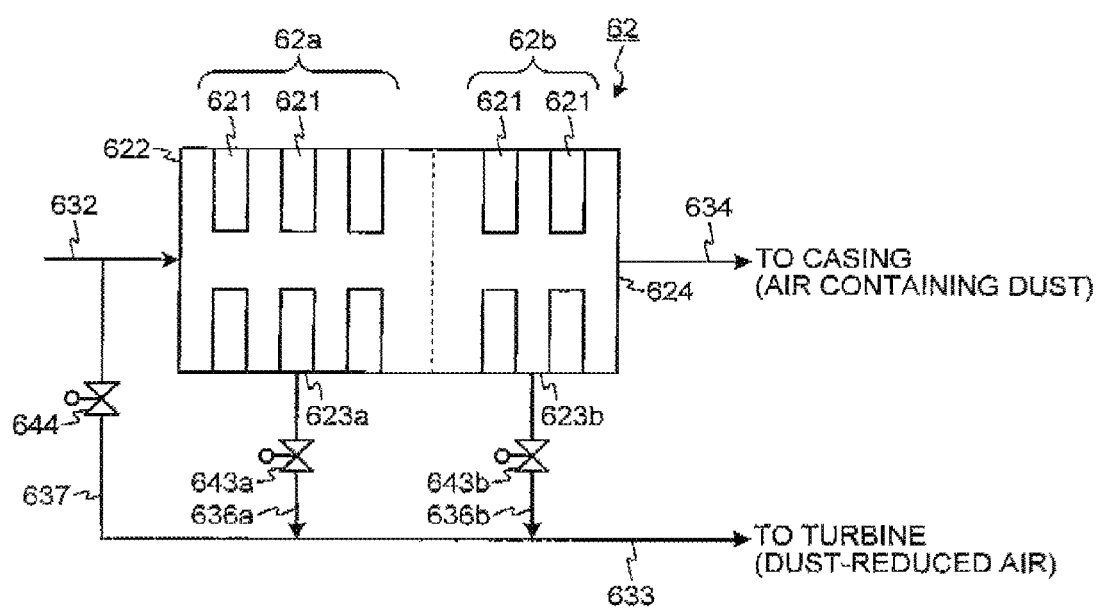
FIG. 9 is a schematic diagram of a filter in the gas turbine shown in FIG. 8.

FIG. 8 is a configuration diagram of a modification of the gas turbine shown in FIG. 5. FIG. 9 is a schematic diagram of a filter in the gas turbine shown in FIG. 8. In these drawings, constituent elements identical to those of the gas turbine 1 shown in FIG. 1 and the filter 62 shown in FIG. 2 are denoted by like reference signs and explanations thereof will be omitted.

The configuration of the gas turbine 1 according to this modification is different from that shown in FIG. 5 in that the filter 62 has a separated structure (see FIGS. 8 and 9). For example, in the present embodiment, the filter 62 is separated into a front part 62a and a rear part 62b. Furthermore, a bleed portion 623a of the front part 62a and the supply pipe 633 on the turbine 4 are connected to each other via a filter pipe 636a, and a bleed portion 623b of the rear part 62b and the supply pipe 633 on the turbine 4 are connected to each other via a filter pipe 636b. Further, opening/closing valves 643a and 643b are installed on the filter pipes 636a and 636b, respectively. The control device 71 opens or closes these opening/closing valves 643a and 643b, thereby switching a configuration in which the entire filter 62 (the front part 62a and the rear part 62b) are used to reduce dust and a configuration in which only the front part 62a of the filter 62 is used to reduce dust. Specifically, when both of the opening/closing valves 643a and 643b are opened, the entire filter 62 is used to perform a dust reduction process. Meanwhile, when the opening/closing valve 643a of the front part 62a is opened and the opening/closing valve 643b of the rear part 62b is closed, only the front part 62a of the filter 62 is used to perform the dust reduction process.

In the filter 62 having a centrifugal separation structure or an inertial dust collection structure, as the flow velocity of cooling air passing therethrough becomes faster, the dust reduction efficiency thereof is further improved. Therefore, when the flow velocity of cooling air passing therethrough is constant, the dust reduction efficiency thereof when the dust reduction process is performed by using only the front part 62a of the filter 62 is higher than that in the case where the dust reduction process is performed by using the entire filter 62.

In the configuration using the filter 62, it is preferable to switch a configuration in which the dust reduction process is performed by using the entire filter 62 and a configuration in which the dust reduction process is performed by using only the front part 62a of the filter 62, according to the circulation amount of dust in cooling air. For example, the circulation amount of dust in cooling air is acquired by using the dust monitor 722, and when the circulation amount of dust is lower than the predetermined threshold, the dust reduction process is performed by using the entire filter 62. Further, when the circulation amount of dust is equal to or higher than the predetermined threshold, the dust reduction process is performed by using only the front part 62a of the filter 62. The latter case is preferable because the flow velocity of cooling air passing through the filter 62 (the front part 62a) increases to improve the dust-reduction processing performance of the filter 62.

[Effect]

As described above, the gas turbine 1 includes the supply pipe 632 for supplying cooling air to the filter 62, the branch pipe 635 branched from the supply pipe 632 on the upstream of the filter 62, and units that calculate or estimate the circulation amount of dust in cooling air (the control device 71 and the various sensors 721 and 722) (see FIG. 1). At the time of start-up of the turbine, the supply pipe 632 on the filter 62 is closed and the branch pipe 635 is opened, and when the circulation amount of dust in cooling air has become equal to or less than the predetermined threshold k1, the supply pipe 632 on the filter 62 is opened and the branch pipe 635 is closed (see FIG. 3 and FIG. 4). In this configuration, because cooling air bypasses the filter 62 through the branch pipe 635 and is not supplied to the filter 62 immediately after start-up of the turbine (t=t1), a state where cooling air containing excessive dust is supplied to the filter 62 is prevented (see FIG. 4). Furthermore, when the circulation amount of dust in cooling air becomes equal to or less than the predetermined threshold k1 (t=t2 onwards), cooling air is supplied to the filter 62. Accordingly, a state where cooling air containing excessive dust is supplied to the filter is prevented, and thus the dust-reduction processing performance of the filter 62 is ensured and the turbine 4 is properly protected.

In the gas turbine 1, it is preferable to monitor the circulation amount of dust in cooling air by using the dust monitor 722 and to calculate or estimate the circulation amount of dust in cooling air based on the monitoring result (Step ST3) (see FIG. 1 and FIG. 3). With this configuration, because the circulation amount of dust in cooling air can be directly acquired by the dust monitor 722, there is an advantage in that the circulation amount of dust can be accurately calculated or estimated.

In the gas turbine 1, it can be estimated that the circulation amount of dust in cooling air has become equal to or less than the predetermined threshold k1, when the turbine revolution speed has become equal to or higher than the predetermined threshold (Step ST3). With this configuration, the circulation amount of dust in cooling air can be acquired more easily than the configuration using the dust monitor 722 (see FIG. 1). Accordingly, the dust reduction control of the gas turbine 1 can be easily performed.

In the gas turbine 1, it can be estimated that the circulation amount of dust in cooling air has become equal to or less than the predetermined threshold k1, when a predetermined time has passed since start-up of the turbine (Step ST4). With this configuration, the circulation amount of dust in cooling air can be acquired more easily than the configuration using the dust monitor 722 (see FIG. 1). Accordingly, the dust reduction control of the gas turbine 1 can be easily performed.

In the gas turbine 1, it is preferable that cooling air bypasses the filter 62 and is supplied to the turbine 4, when the circulation amount of dust in cooling air becomes equal to or less than the predetermined threshold k2 (see FIG. 5 to FIG. 7). With this configuration, cooling air from the compressor 2 bypasses the filter 62 and is directly supplied to the turbine 4. Accordingly, a pressure loss in cooling air by the filter is avoided, and thus the cooling efficiency of the turbine 4 is improved. In addition, at this time, because the circulation amount of dust in cooling air supplied to the turbine 4 is sufficiently small (equal to or less than the threshold k2), operations of the turbine 4 are not interrupted.

INDUSTRIAL APPLICABILITY

As described above, the gas turbine according to the present invention is useful in a sense that the gas turbine can properly protect a turbine while ensuring dust-reduction processing performance of a filter by preventing occurrence of a state where cooling air containing excessive dust is supplied to the filter.

REFERENCE SIGNS LIST

1 gas turbine
2 compressor
3 combustor
4 turbine
5 rotor
6 turbine cooling structure
61 cooler
62 filter
621 metal element
622 inlet port
623 bleed portion
624 outlet port
631 to 634 supply pipe
636a filter pipe
636b filter pipe
635 branch pipe
636 filter pipe
637 bypass pipe
641 first opening/closing valve
642 second opening/closing valve
643 third opening/closing valve
644 fourth opening/closing valve
65 precipitator
7 control system
71 control device
721 revolution speed sensor
722 dust monitor

The invention claimed is:

1. A gas turbine including a turbine cooling structure of cooling a turbine by using cooling air and a filter that reduces dust in the cooling air on an upstream side of the turbine, the gas turbine comprising:
   a supply pipe for supplying the cooling air to the filter;
   a branch pipe that is branched from the supply pipe on an upstream side of the filter; and
   a unit that calculates or estimates a circulation amount of dust in the cooling air, wherein
   the supply pipe includes a first supply pipe which is disposed downstream of a branching point at which the branch pipe is branched, and a second supply pipe which is disposed upstream of the branching point,
   the first supply pipe includes a first valve, and the branch pipe includes a second valve,
   at a time of start-up of the turbine, the first supply pipe is closed and the branch pipe is opened, and
   when the circulation amount of dust in the cooling air becomes equal to or less than a predetermined threshold k1, the first supply pipe is opened and the branch pipe is closed.

2. The gas turbine according to claim 1, wherein the unit includes a dust monitor, the circulation amount of dust in the cooling air is monitored by using the dust monitor, and the circulation amount of dust in the cooling air is calculated or estimated based on a result of the monitoring.

3. The gas turbine according to claim 1, wherein when a revolution speed of a turbine becomes equal to or higher than a predetermined threshold, it is estimated that the circulation amount of dust in the cooling air has become equal to or less than the predetermined threshold k1.

4. The gas turbine according to claim 1, wherein when a predetermined time has passed since start-up of a turbine, it is estimated that the circulation amount of dust in the cooling air has become equal to or less than the predetermined threshold k1.

5. The gas turbine according to claim 1, wherein when the circulation amount of dust in the cooling air has become equal to or less than a predetermined threshold k2, the cooling air bypasses the filter and is supplied to the turbine.

6. The gas turbine according to claim 1, wherein the filter has a structure of separating dust from the cooling air by centrifugal separation or inertial separation to extract dustless cooling air, and supplies extracted cooling air to the turbine.

* * * * *